Sept. 17, 1946.　　T. B. MARTIN ET AL　　2,407,791
GOVERNOR VALVE
Filed June 1, 1942　　2 Sheets-Sheet 2
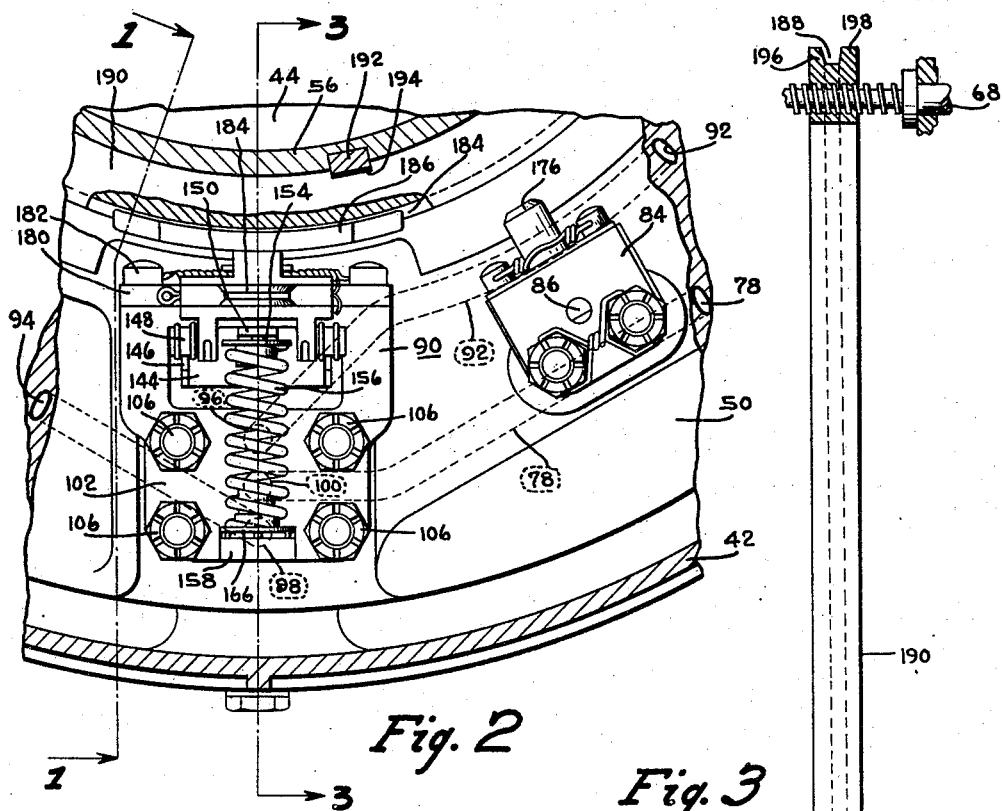
Fig. 2
Fig. 3
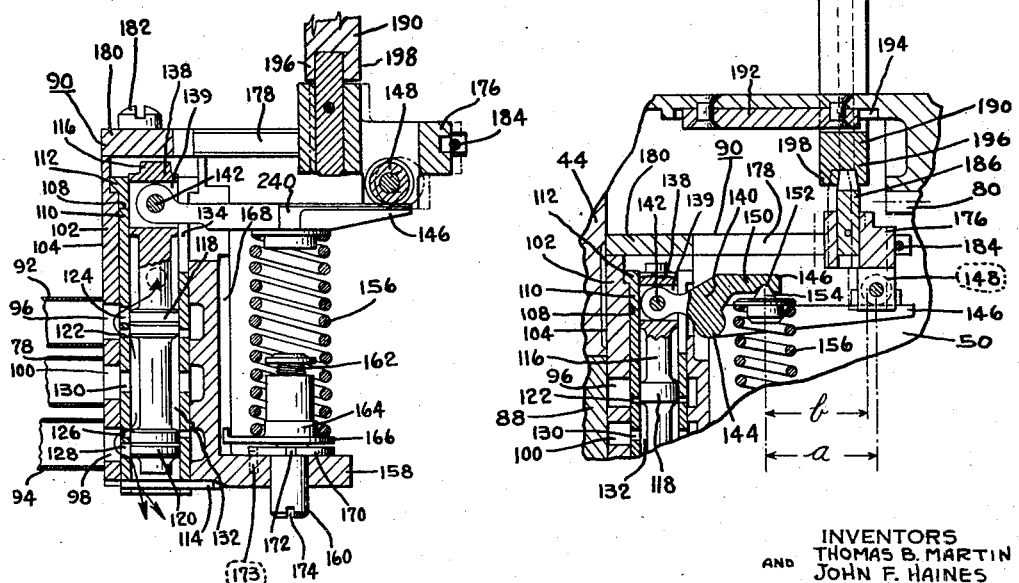
Fig. 4
INVENTORS
THOMAS B. MARTIN
AND JOHN F. HAINES
BY
their ATTORNEYS Patented Sept. 17, 1946

2,407,791

UNITED STATES PATENT OFFICE 2,407,791

GOVERNOR VALVE

Thomas B. Martin and John F. Haines, Dayton, Ohio, assignors to General Motors Corporation, Detroit, Mich., a corporation of Delaware Application June 1, 1942, Serial No. 445,366

18 Claims. (Cl. 170—163)

This invention relates to variable pitch propellers, and particularly to those controlled by a fluid medium confined by a system of fluid connected passages within which the fluid medium under pressure is selectively or automatically directed into an expansion chamber for altering the effectiveness of a rotating propeller blade such as described and claimed in the U. S. patent to Blanchard et al. 2,307,102 and on which this is an improvement.

An object of the invention is to provide a control valve and governing mechanism that will be instantaneously responsive to slight changes of a controlling force.

Another object is to provide a governing mechanism that will be sustained in a potentially responsive condition, such as to be immediately available to respond to a weak controlling function in correcting blade pitch setting upon slight variation from a selected standard of propeller operation.

Another object is to provide means for maintaining a control valve in a state of constant vibratory motion of relatively small magnitude preparatory to being moved to a force-delivering position immediately that a controlling function for correction from a condition of unbalance is manifest.

Another object is to maintain a radially movable spring resisted control valve in a state of sustained oscillation so that the control valve will be in readiness to effect a controlling function bearing a definite relation to a change from a prescribed condition, directly that such change occurs.

Another object of the invention is the substantial elimination of friction effects in a control valve mechanism subject to small changes of controlling force, whereby the control valve will be more readily responsive for correcting deviations from a predetermined standard of operating conditions.

A further object is to provide a governor mechanism for fluid circuits that is basically simple in design and easily of fabrication though efficient and sensitive to changes in a controlling force at all speeds of operation and which makes use of a single spring force opposing centrifugal force that gives stability by reason of a combination of spring rate, columnar rigidity and geometrical relation of parts.

Further objects and advantages of the present invention will be apparent from the following description, reference being had to the accompanying drawings wherein a preferred embodiment of the present invention is clearly shown.

In the drawings:

Fig. 2 is a transverse sectional view substantially as indicated by the line and arrows 2—2 of Fig. 1.

Fig. 3 is a fragmentary showing on an enlarged scale illustrating certain features of the invention, it being a view substantially as indicated by the line and arrows 3—3 of Fig. 2.

Fig. 4 is a similar fragmentary view in section showing a modified form valve actuating lever.

Figure 1:
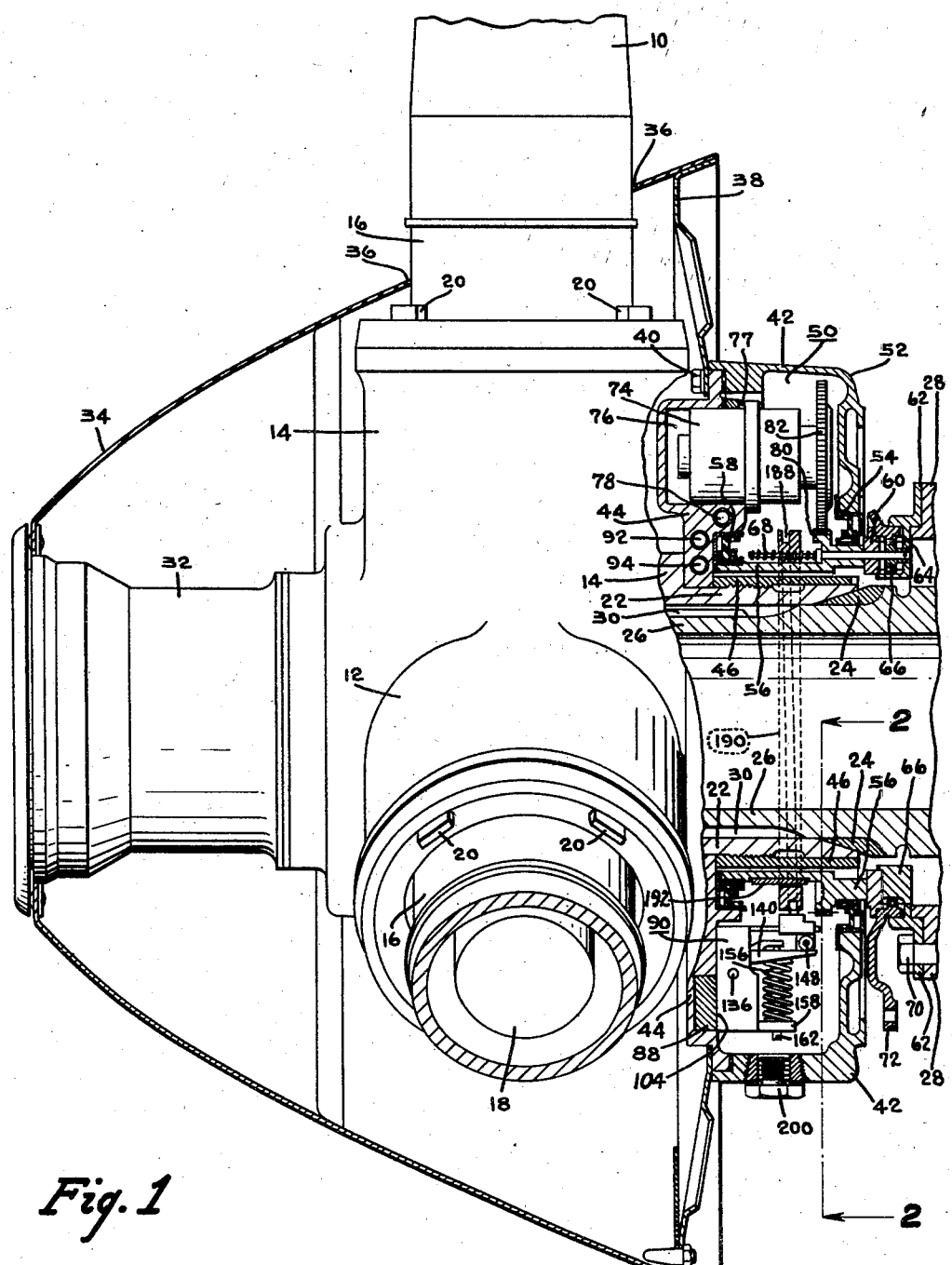
Fig. 1 is a sectional view of a propeller mechanism fitted with a fluid actuated regulator mechanism embodying the instant invention, it being a view partly in section and partly in elevation, substantially as indicated by the line and arrows 1—1 of Fig. 2.

With particular reference to the drawings, there is shown in Fig. 1, a controllable pitch propeller having blades 10 rotatably mounted in sockets 12 radiating from a hub 14, the blades having hollow root portions 16 enclosing torque applying units 18 where they are anchored in retained position by blade retaining nuts 20. The hub 14 extends rearwardly to provide a sleeve 22 that seats on a rear cone 24 carried by an engine driven shaft 26 extending from within an engine nosing or casing 28, there being splined connections 30 between the shaft and sleeve to provide the necessary driving couple. The hub is retained on the shaft in the conventional manner by use of a forward cone and shaft nut, not herein shown. Affixed to the forward end of the hub in any preferred manner is a spinner adapter 32 that pilots the front end of a spinner 34 adapted to fair the hub and proximate portions of the blades, the spinner being notched appropriately at 36 for passage of the blade roots in assembling. The rear end of the spinner is supported by a bulk-head member or plate 38 of annular form and whose inner periphery is secured beneath screw devices 40 threaded into the edge portion of a regulator 42.

The regulator is of annular form mounted for rotation with the hub 14, and comprises a plate member 44 having a central aperture making a sliding fit over the sleeve portion 22 of the hub where it is held in firm engagement by a sleeve nut 46. The plate member 44 operates as a support for fluid actuated control mechanism and fluid connections therebetween as will presently appear, and provides one wall of a reservoir 50 enclosed by a cover member 52 fitting over the edge of the plate 44 where it is held by the screw devices 40 before mentioned. The cover member 42 extends radially inward to support an oil seal 54 that engages the rear end of an adapter sleeve 56 extending into the reservoir along and in radially spaced relation with respect to the sleeve nut 46, the inner or forward end of the adapter sleeve engaging a second oil seal 58 carried by the plate 44.

The adapter sleeve 56 is maintained against rotation with respect to the regulator by means of external support from the engine nosing 28, and is accomplished by means of an abutting ring 60 engaging an adapter ring 62, the two of which are circumferentially grooved to provide for a way to oscillatably receive a ring gear 64 meshing with pinions 66 on the ends of screw shafts 68 journaled in the adapter sleeve 46. Screw devices (not shown) retain the elements 56, 60 and 62 in relatively non-rotatable relation, and as an adapter assembly are retained against rotation with respect to the regulator and hub by screw devices 70 engaging the engine nosing 28. For oscillating the ring gear 64, it is provided with an extension 72 to which may be connected a control cable or rod such as to be manipulated in the cockpit, and makes it possible to oscillate the ring gear 64 which rotates the screw shafts 68 and thereby moves anything that is appropriately connected with the ends of them extending within the reservoir 50.

The fluid actuated control mechanism supported by the plate 44 includes a pump or pressure developing means 74 mounted in a pocket or recess 76 of the plate and adapted to have an intake 77 from the reservoir 50, which pressure fluid is delivered to a pressure supply passage 78 in accordance with the impetus given by a pump driving gear 80 provided by the adapter sleeve 46, and meshing with a pump gear 82. Exposed to the pressure of the fluid in the pressure supply passage 78 there is a relief valve 84 that determines the maximum of pressure that may be built up within the passage and adapted to spill any excess into the reservoir 50 through a port 86. The terminal end of the pressure supply passage 78 is at a juncture block 88 that forms a mounting pad for a distributing valve and governor mechanism 90. Also ending at the mounting pad there are two control passages 92 and 94 each of which leads from a port 96 and 98 respectively in the governor mechanism and communicate with opposite sides of the torque applying units 18 before mentioned. Similarly, the pressure supply passage 78 communicates with a port 100 of the governor mechanism and makes provision through operation of the governor mechanism to deliver fluid under pressure to either side of the torque applying units. The governor mechanism responds to predetermined operating conditions of the propeller to shift from a position in which the control passages are subject to equal pressures, to a position in which greater pressure is delivered to one or the other of the ports 96 and 98 for correction with respect to a particular setting on a scale.

The governor mechanism under consideration comprises a valve block 102 having a machined face 104 for mounting against the plate 44 over the pad 88 by means of screw devices 106. Opening through the face 104 there are the ports 96, 98 and 100 before mentioned, and the inner extents thereof are intersected by a bore 108 adapted to receive in press-fitted or other sealed relation a porting sleeve 110 so located as to extend radially of the axis of rotation for the propeller.

The inboard end of the porting sleeve 110 is provided with an outwardly extending flange 112 adapted to engage the block 102 at the end of the bore 108 and prevent longitudinal movement thereof in response to centrifugal force, while the other or outboard end of the sleeve projects sufficiently beyond the block to receive a cross-pin 114 for retaining the sleeve in place and for preventing rotation with respect to the block. Adapted for reciprocation within the sleeve there is a valve plunger 116 having a pair of longitudinally spaced lands 118 and 120 and adapted normally to register with ports in the porting sleeve 110 that open into the ports 96 and 98. The ports in the sleeve 110 that register with the ports 96 and 98 are unique in their arrangement or location, in that they are arranged as sets or series, and for each port of the control passages a set comprises a circular row of small openings 122 and a circular row of large openings 124 for the control port 96, with similar rows of small and large openings 126 and 128 respectively for the control port 98. While the large openings in one row may be staggered with respect to the small openings of the other and associated row, it is desirable that the small openings of each series be on the proximate sides of the respective series, and that the lineal extent of the series of openings be slightly greater than the longitudinal dimension of the cooperating land of the plunger valve. That particular relation is shown generally in Fig. 4, where it appears that the land 118, though the valve is in the equilibrium position, does not completely cover both rows of openings 122 and 124. The same is true with respect to the land 120 and the rows of openings 126 and 128.

The porting sleeve 110 also has openings 130 therethrough that operate to connect the port 100 from the pressure supply passage 78 to the space 132 within the porting sleeve 110 between the lands 118 and 120. Thus, in a state of equilibrium, oil or other fluid pressure medium is admitted to the three sets of openings in the porting sleeve, the center set of openings being exposed to the high pressure line from the pump and having no metering characteristics. Partially covering the other two sets of openings are the two lands of the plunger or distributor valve so as to have definite metering characteristics which give a proportionalizing characteristic to the governor by causing the effective valve opening to hold a definite relationship to the amount of correction to be made.

At the ends of the plunger valve 116 beyond the lands 118 and 120 the porting sleeve is opened to the reservoir 50 such as to remove all restriction to fluid flow relieving one of the control passages 92, 94 when the other is being impressed with a fluid under pressure. As to the outboard end of the valve, the return from the port 98 is through the open end of the sleeve around the cross pin 114, and the inboard end is slotted at 134 through the flange 112 and a portion of the sleeve, through which the return from port 96 is had. To insure that this relief is sufficient to take care of the return flow additional holes 136 may be provided that open from the sleeve inboard of the land 118 through the side of the block into the reservoir 50.

The inboard end of the valve plunger 116 is provided with a third land 138 having a diametrical slot or the like 139 adapted to receive one end of a lever 140 extending from the reservoir 50 through the slot 134 of the sleeve where it is pivotally connected by a cross-pin 142. In the form shown in Fig. 3, the lever 140 is of yoke construction in which a bridge portion 144 extends crosswise of the lever just outside of the block 102 and at its ends joins one end each of a pair of parallel arms 146 that extend lengthwise of the lever to engage a fulcrum roller 148. Extending from the bridge 144 in offset relation and between the arms 146 there is a shelf portion 150 whose one surface is socketed at 152 to seat the point of a seating member 154 engaged by one end of a compression spring 156. In the form shown in Fig. 4, the lever 140 embodies some modification and simplification as indicated by the reference character 240, and comprises a single substantially straight lever extending from the valve member 116 into the reservoir 50 to engage a single fulcrum roller 148. At an intermediate point of its length it supports a spring seating member 254 engaged by one end of the spring 156.

In either case, for supporting the other end of the spring 156 there is an arm 158 extending from the block 102 substantially parallel with the valve actuating lever and which is apertured to receive the plain stem 160 of an adjustable plug 162 carrying a second spring seat 164. The spring seat 164 is threaded upon the plug 162 and has an arm 166 engaging in a slot 168 of the block 102 to prevent its turning relative to the block. A stop collar 170 on the plug is notched at 172 for ratcheting or detenting with a pin 173 in the arm 158, and a screwdriver slot 174 provides for selected adjustment of the spring 156. Since the portion 160 is capable of rotating and sliding in the hole of the arm 158, a screwdriver applied to the slot 174 serves to push the stop collar 170 away from the arm 158 and disengage one of the notches 172 from the cooperating pin, after which the plug 162 may be turned until there is registration with some other notch. The force of the spring 156 tends always to urge the stop collar 170 against the arm 158, and from that as a rigid support applies its force to the valve actuating arm 140 or 240 as the case may be, tending to rock the arm about its roller fulcrum 148.

That rocking of the arm, if it were not opposed by some other force would result in movement of the attached valve plunger 116 to a position inboard of the equilibrium position shown in Fig. 4. That inboard position is what is termed the "under speed" position and is that normally taken when the propeller mechanism is at rest such as when the engine is not operating. It is also the position of the valve when it is moved to correct the blade pitch adjustment for a drop in propeller speed. An opposite extreme or outboard position is possible as will presently appear, and is termed the "over speed" position, which is the position of the valve when it is moved to correct the blade pitch adjustment for a rise in propeller speed. The "over speed" position is due to centrifugal force acting on the valve plunger 116 and associated lever, which is the force that opposes the force of the spring 156 tending to rock the arm 140 or 240 about its respective fulcrum.

With the fulcrum roller set in any normal position, as shown in Figs. 3 and 4, centrifugal force tends to throw the valve member 116 outwardly or to the "over speed" position. That motion is resisted by the spring 156 acting through the lever system. At equilibrium speed the moments about the fulcrum roller of the spring force and the centrifugal force acting upon the valve member 116 are exactly equal and the valve member takes a neutral position, partially covering both sets of holes or openings in the porting sleeve. Under those conditions no pressure fluid flows to the torque applying units or from them and the pitch of the blades remains constant. An increase of speed above the equilibrium speed will cause the centrifugal moment to be dominant and the governor valve will move outwardly to the "over speed" position, opening the control passage 94 to the high pressure fluid, and the control passage 92 to the reservoir. In that position the fluid under pressure will flow from the pump to one side of the torque applying unit for increasing the pitch of the propeller blades. The increased pitch will cause the engine to slow down and the slowing down of the engine will in turn bring the governor valve member 116 back to its neutral position. Conversely, a drop in speed from the equilibrium speed will open the control passage 92 to the high pressure fluid and the control passage 94 to the reservoir 50 causing fluid under pressure to flow from the pump to the other side of the torque applying unit, thereby decreasing the pitch of the propeller blade until the governor valve is brought back to the normal or equilibrium position.

In order to control the equilibrium or governor speed, the roller fulcrum 148 may be moved fore and aft of the lever arm 140 or 240, thereby changing the equilibrium speed by changing the ratio of the spring force arm to the centrifugal force arm. As the roller is moved toward the end of the lever the spring force becomes more effective and more centrifugal force is required to move the valve member 116 out to the equilibrium position. That movement is accomplished by mounting the fulcrum roller or rollers 148 on a carriage 176 so that it may slide along on ways 178 extending along side of the lever 140 or 240. The ways 178 may comprise the parallel arms of a notched plate 180 secured to the valve block 102 by screw devices 182, and the end of the arms should support a key or pin 184 to forestall separation of the carriage therefrom. The carriages in both of the forms illustrated in Figs. 3 and 4 are the same except that for the single arm construction of Fig. 4, it provides but one fulcrum roller 148, while that for the double arm construction of Fig. 3 provides two fulcrum rollers, one for each of the arms 146. Attached to the carriage is a shoe 186 that rides in a groove 188 of a control ring 190 mounted for movement lengthwise of the adapter sleeve 56, which, as stated above, is a relatively fixed part of the propeller. Axial movement of this control ring is accomplished by the screw shafts 68 hereinbefore described, and desirably there are three of them distributed about the circumference of the adapter sleeve so that movement of the ring gear 64 rotates all of the screw shafts coincidentally. From the foregoing it can be seen that each position of the control lever 72 corresponds to a definite equilibrium speed for the propeller. The screw shafts 68 may be sufficient to prevent the control ring from rotating with respect to the relatively fixed parts of the assembly, such as the adapter sleeve 56, but it is desirable to insure its non-rotation by means of a key or keys 192 or the like secured to the adapter sleeve 56 and received in sliding engagement by a notch 194 cut in the inner surface of the control ring 190.

By that construction, when the propeller is rotating, the regulator and all of the structural elements carried by it rotate about the adapter assembly secured to the engine nose and extending into the regulator. Thus, the adapter sleeve and control ring are held against rotation and the governor mechanism is caused to revolve about them, the shoe 186 riding in and following the course of the groove 188.

The groove 188 in the control ring 190 is machined with a slight fore and aft wobble so that the governor fulcrum 148 oscillates fore and aft during each revolution of the propeller. The groove may be so formed that it lies in a plane forming an angle with the plane of the control ring, such as to provide a narrow flange 196 on one side of the groove and a wide flange 198 on the opposite side, with reverse relations at one or more points about the circumference of the control ring. Those features are shown in Fig. 3 of the drawings from which it should be apparent that rotation of the regulator mechanism with respect to the control ring 190 causes a reciprocating or vibrating motion of the carriage 176 for each rotation of the propeller. For that particular equilibrium setting of the carriage, the arrows a indicate the maximum length of the spring force arm or that obtaining while the fulcrum roller 148 is in the aft position of the oscillatory travel, while the arrows b indicate the minimum length of the spring force arm or that obtaining while the fulcrum roller 148 is in the fore position of said travel. The difference in length between the maximum and minimum spring force arms then represents the extent of the sustained incremental movement imparted to the carriage, and hence the fulcrum roller, due to the wobble of the control ring groove. The vibratory motion of the carriage need not be great, and desirably should not be great, but should be of such extent that the valve member 116, in responding to the continuous and reversing influences due to the aforementioned motion will be maintained in sustained oscillation so as to be potentially responsive to an actual speed change. Under those conditions, the control valve will be readily responsive to slight changes of a controlling force because of the elimination of static friction from the entire movable portion of the governor mechanism. The fulcrum roller 148 may be moved to a point more or less distant from the point of spring force application in order to establish a new equilibrium speed for which regulation is to be made. The selection of a new governing speed will not, however, disturb or upset the oscillatory feature of the installation. It is of note that the motion of the valve piston is of such rapidity that in "oscillating" it does not operate to effect any appreciable pitch shift. In effect then, when the valve is called upon to effect a regulating function it will have already been started on its movement toward either the "under speed" or "over speed" position, resulting in the requirement of less force and time in accomplishing the governing function.

Governor adjustment for maximum speed is obtained by adjusting the governor spring 156, access to which may be had by removing the filler plug 200 in the cover 52 of the regulator housing. As hereinbefore described, a slotted screw 174 is located inside the regulator cover, which has a bearing face 164 in contact with the governor spring 156. By placing a screw driver in the slotted screw head and pushing the screw in approximately 1/16 inch to clear the locking pins, it is possible to turn the screw. The governor spring pressure keeps the slots 170 engaged with the pins at all times, assuring a positive lock. Turning the adjusting screw 162 clockwise gives a decrease in R. P. M., and turning it counter-clockwise gives an increase in R. P. M. Particular attention should be given to the spring 156. It should be made accurately so that its columnar rigidity can be controlled through the ratio of wire size to diameter. Particularly in the form of construction shown in Fig. 4, stability at high speed is maintained by the proper spring rate while stability at low speed is assisted by the columnar rigidity of the spring resisting the tilting action of the governor lever. As an example of a suitable spring having the desired characteristics use may be made of a spring having compressed force and rigidity in the order of 26 pounds when compressed to something like one-quarter inch less than its assembled length as shown in the drawings.

From the foregoing it is apparent that the regulator mechanism can be assembled as a single unit complete with all of the control mechanism mounted on the plate 44 and enclosed within the reservoir provided by the plate 44 and the cover 52, rotatably engaging the adapter assembly and particularly the sleeve 56 which completes the enclosure of the reservoir 50, thereby forming a complete unit. That unit so assembled may be shipped separately as a replacement unit, or it may be installed immediately on the propeller construction. In either case, the unit when assembled with the propeller is passed over the sleeve 22 where it is retained by the sleeve nut 46 threading upon the sleeve 22. The assembled hub and regulator is then mounted on the shaft 26 and pushed rearwardly until the adapter plate 62 can be anchored to the engine nose 28 by means of one or more screw devices 70. Coincident with that, the hub sleeve 22 will seat against the rear cone 24 where it is held by the usual forward cone and shaft nut. If the reservoir 50 has not theretofore been charged with the fluid operating medium it should now be done by rotating the propeller until the filler plug 200 is something like 15° above the horizontal passing through the axis of rotation. The fluid pressure medium, which might be a light oil, is now added until it reaches the level of the opening for the plug. Replacement of the plug and safetying, as should be done with all others of the screw devices, conditions the structure for immediate operation, though it is advisable to make tests and adjustments on the ground before actual flight is attempted.

While there has been shown and described means for accomplishing the vibratory motion of the fulcrum as embodying a groove disposed at an angle with the plane of rotation, the same result may be accomplished by means of a groove that wavers fore and aft of the plane of the ring carrying it. That is, the groove may be an undulating groove of regular or irregular track cut in the periphery of the ring so that the shoe in following it may cause reciprocation of the fulcrum and carriage for each rotation of the device. Satisfactory results might also be accomplished by using screw shafts of different pitch so that as the control ring is moved fore and aft of the adapter sleeve, the control ring, and consequently the groove, is caused to change its inclination with respect to the plane of rotation. In that way, the amount of vibration, or rather the amplitude of the vibratory movement would change as the fulcrum is moved fore or aft of the adapter sleeve, so that the greater amplitude would be during the higher speed of propeller rotation.

While the embodiment of the present invention as herein disclosed, constitutes a preferred form, it is to be understood that other forms might be adopted, all coming within the scope of the claims which follow.

What is claimed is as follows:

1. In an aircraft propeller, the combination of a cylindrical porting sleeve, a piston valve movable longitudinally relatively thereto, means mounting the sleeve and valve for rotation with the propeller, means including a balance of spring force and centrifugal force for maintaining the sleeve and valve in a relatively equilibrium position but adapted on domination by either spring force or centrifugal force to effect relative unidirectional movement of the valve and sleeve, and means operative upon rotation of the propeller effecting sustained vibratory reciprocating movement of the valve and along the same path as said unidirectional movement.

2. The combination of a cylindrical porting sleeve, a piston valve movable within and along the bore of said sleeve in one direction in response to centrifugal force, means including a spring for opposing movement of the valve by centrifugal force and tending to move the valve in the other direction to establish an equilibrium position of the valve within the sleeve, said valve adapted upon domination of either opposing force to move toward an extreme position within the sleeve to effect a control function, means for rotatably mounting the sleeve, valve and spring, and mechanical means continuously acting upon said valve throughout rotation of the assembly for effecting lineal vibration of the valve within the sleeve in the direction of movement of the valve to a control position, whereby said valve is maintained continuously in a state of readiness to move to the control position directly that a control function is manifest.

3. A governor control mechanism comprising a valve block having pressure supply and control ports, a piston valve member slidable within the valve block, rotating means for supporting the block for revolution about an axis normal to the sliding movement of said valve, means including a balance of spring force and centrifugal force of valve revolution for establishing an equilibrium position between the valve member and the control ports, said last means adapted on domination of either of the balancing forces to move the valve member from the equilibrium position to a controlling position in which one of the control ports is connected with the pressure supply port, and cam means continuously operable upon rotation of the support means for effecting lineal vibration of the valve member without interfering with the amount and the direction of its sliding movement.

4. A governor control mechanism for a rotatable assembly comprising in combination, a valve block having pressure supply and control ports, a valve member having lands adapted to cover the control ports of the block and being of such mass as to constitute a weight member responding to centrifugal force, means for rotatably mounting the block so that the valve member may move radially of the axis of rotation from an equilibrium positioning covering the control ports to either of two positions connecting a control port with the pressure supply port, a lever pivotally connecting the valve member, rigid members extending from the block and disposed on either side of the lever, a fulcrum carried by one of the rigid members adapted to support the lever, and spring means engaging the lever and the other of the rigid members for balancing the centrifugal force acting on the valve member while it is in the equilibrium position.

5. The combination set forth in claim 4, in which means are provided for moving the fulcrum along the rigid member toward and from the point of spring engagement with the lever.

6. A governor control mechanism comprising in combination, a valve block having a longitudinal bore providing a pressure supply port intermediate a pair of control ports, a valve member movable along the bore of the block and having lands adapted to cover the control ports, a lever pivotally connected to the valve member and extending to one side of the block, rigid support means disposed on either and opposite sides of the lever, a movable fulcrum carried by one of the rigid supports engaging the outer extent of the lever, yieldable means engaging an intermediate portion of the lever and the other of the rigid supports, rotatable means supporting the block and valve member so that the latter is radially disposed with respect to the axis of rotation, centrifugal force tending to move the valve member from an equilibrium position outward to a controlling position, and said yieldable means opposing the centrifugal force to move the valve from the equilibrium position inward to a second control position, said yieldable means and centrifugal force effecting a balance of forces on the lever to maintain the valve in the equilibrium position while the valve and block supporting means are rotating at a pre-selected speed, means for moving the fulcrum for selecting the speed, and means continuously operable upon the fulcrum for vibrating the valve member so as to reduce the static friction and maintain the valve susceptible to control movement on domination of either force.

7. A governor control mechanism comprising in combination a valve chamber having spaced ports, a centrifugally responsive weight member comprising a valve stem disposed within the chamber and controlling said ports by relative reciprocation between said stem and chamber, means providing a reservoir for enclosing the chamber and stem supplying a source of operating fluid therefor, means for rotating the reservoir thereby revolving the chamber and stem, means extending into from without the reservoir for manually controlling the valve stem with respect to the chamber, and means automatically operable upon rotation of said reservoir and including said extending means for vibrating the valve along its reciprocating path, whereby to condition the valve stem for movement in response to small forces calling for a change of position of said valve stem.

8. A propeller control mechanism for use with a controllable blade propeller having fluid actuated means for effecting change in pitch of the blades, comprising in combination, a housing rotatable with the propeller shaft, a relatively stationary member projecting into the housing and cooperating therewith to form a reservoir, pump means within the housing and having an inlet from the reservoir, means for actuating said pump means upon relative rotational movement between said stationary member and said housing to provide a source of said fluid pressure, a regulator valve member within said housing responsive to the speed of rotation for selectively controlling the application of said fluid pressure to said fluid actuated means to effect change of pitch of the propeller blades, means outside of the housing and projecting into the reservoir for selecting the speed of rotation at which the regulator valve member will effect a change in pitch, and means including a part of the stationary member effecting lineal vibration of the regulator valve member within the housing sufficient to overcome static friction to movement so that small changes in speed of rotation of the propeller will be responded to by the regulator valve member for connecting the pump developed pressure with the fluid actuated means.

9. A propeller control mechanism for use with an adjustable blade propeller having fluid actuated means for effecting change in the pitch of the blades, comprising in combination, a source of fluid pressure, a regulator valve body mounted for rotation with said propeller and directly responsive to centrifugal force, means for supplying the pressure fluid under the control of said regulator valve to said fluid actuated means, resilient means acting radially with a force substantially independent of the speed of said propeller for opposing the action of centrifugal force on said body with a predetermined regulating force, a lever for applying the force of said opposing means to be effective upon said valve body, an adjustable control operable from the exterior of said rotating propeller for varying the effective moment arm of said lever, and means constantly acting upon said lever for vibrating said regulator valve along the path of movement effected by the centrifugal force and opposing means, said vibration conditioning the regulator valve for movement in response to slight disturbances of equilibrium between centrifugal and opposing forces.

10. The combination set forth in claim 9, wherein the adjustable control includes a control ring and a plurality of spaced high lead control screws with means for coincidentally rotating the control screws, said control ring providing a groove therein with fore and aft points disposed on opposite sides of the plane of the ring, and means including a fulcrum supporting one end of the lever and following the groove of the ring for vibrating the regulator valve along the path of movement effected by the centrifugal force and opposing means thereby minimizing static friction of the valve member against movement by a control function.

11. In a controllable pitch propeller, a regulator mechanism comprising in combination, a governor valve assembly carried by the propeller and revolvable about a relatively fixed part, said assembly including a valve block having spaced ports opening into a radially extending bore, a valve stem being itself directly responsive to centrifugal force and subject to generally radial movement along the bore of said block, a lever pivoted to the valve stem and extending substantially at right angles to said radially extending bore, a movable fulcrum interposed between the lever and said fixed part for supporting the end of the lever, means exerting a substantially constant spring force bearing upon an intermediate portion of the lever and opposing movement of the valve stem by centrifugal force, said spring force and centrifugal force at a predetermined speed of propeller rotation maintaining the valve stem in equilibrium position with respect to the spaced ports, means carried by the relatively fixed part for moving the fulcrum for determining the speed at which the equilibrium position shall obtain, and means for impressing upon said fulcrum during rotation of the propeller reciprocating movement of short amplitude along the lever for vibrating the valve stem lineally of the path of control movement.

12. The combination set forth in claim 11, wherein the means for moving the fulcrum for speed determination constitutes a control ring slidable axially of the fixed part and which control ring has a movable groove within which rides a shoe for effecting reciprocatory movement of the fulcrum.

13. The combination set forth in claim 11, wherein the means for moving the fulcrum constitutes a control ring slidable along the fixed part and has a groove within which rides a shoe carried by the fulcrum, said groove lying in a plane forming an angle with the plane of rotation, whereby said fulcrum is reciprocated for each revolution of the propeller.

14. In a controllable pitch propeller, a regulator mechanism comprising in combination, a governor valve assembly carried by the propeller and revolvable about a relatively fixed part, said assembly including a valve block having spaced ports opening into a radially extending bore, a valve stem being itself directly responsive to centrifugal force and subject to generally radial movement along the bore of said block, a lever operable upon the valve stem and extending substantially parallel with the axis of rotation for the propeller, a movable fulcrum interposed between the lever and the fixed part for supporting the end of the lever, means exerting a substantially constant yielding force bearing upon the lever at a point intermediate its length and opposing movement of the lever by centrifugal force, said yielding force and centrifugal force at a preselected speed of propeller rotation maintaining the valve stem in equilibrium position with respect to the spaced ports, means provided by the relatively fixed part for moving the fulcrum for preselecting the speed at which the equilibrium position shall obtain, and means for impressing upon said fulcrum in response to rotation of the propeller lineal vibratory movement of short amplitude along the length of the lever.

15. The combination set forth in claim 14, in which the means for moving the fulcrum constitutes a control ring slidable along the fixed part and has a groove within which rides a shoe carried by the fulcrum, said groove lying in a plane forming an angle with the plane of said control ring, whereby said fulcrum is reciprocated during each rotation of the propeller.

16. The combination set forth in claim 14, in which the means for moving the fulcrum constitutes a control ring slidable along the fixed part and has a camming groove in its periphery within which rides a shoe carried by the fulcrum, whereby rotation of the propeller mechanism about the fixed part causes vibratory movement of the fulcrum along the length of the lever.

17. The combination set forth in claim 9 wherein the adjustable control includes a grooved control ring and high lead screws operable from a remote point for moving the control ring along the length of the lever, said high lead screws maintaining the groove of said ring with spaced points fore and aft of the plane of the ring whereby the fulcrum in following the groove effects vibratory movement of the valve member during rotation of the propeller.

18. In a rotatable hydraulic regulator for aircraft propellers, the combination comprising, a plate providing a conduit system mounted for rotation by the propeller, a fixed tubular extension ending near the plate, a control valve including a porting sleeve open to the conduit system, and a plunger mounted on the plate for rotation therewith, said plunger itself being a weight member responding to centrifugal force of propeller rotation for controlling the flow of fluid in the conduit system, means carried by the tubular extension for controlling the action of the plunger and including a grooved ring movable axially of the extension, and means including the control ring for rapidly reciprocating the plunger throughout rotation of the plate relative to the extension.

THOMAS B. MARTIN.
JOHN F. HAINES.